(12) United States Patent
Ben-Tzur et al.

(10) Patent No.: US 7,835,885 B2
(45) Date of Patent: Nov. 16, 2010

(54) PRE AND POST-HARVEST QC DATA ACQUISITION SYSTEM FOR AGRICULTURAL PRODUCTS

(76) Inventors: Israel Ben-Tzur, 83 Snir Street, 25147 Kfar Vradim (IL); Ariel Shapiro, 8 Tchernichovsky Street, 46499 Herzliya (IL)

(*) Notice: Subject to any disclaimer, the term of this patent is extended or adjusted under 35 U.S.C. 154(b) by 717 days.

(21) Appl. No.: 10/558,528

(22) PCT Filed: May 28, 2004

(86) PCT No.: PCT/IL2004/000457
§ 371 (c)(1),
(2), (4) Date: Nov. 16, 2007

(87) PCT Pub. No.: WO2004/107770
PCT Pub. Date: Dec. 9, 2004

(65) Prior Publication Data
US 2009/0076645 A1  Mar. 19, 2009

Related U.S. Application Data

(60) Provisional application No. 60/474,692, filed on May 29, 2003.

(51) Int. Cl.
*G06F 19/00* (2006.01)
(52) U.S. Cl. .................................................... 702/188
(58) Field of Classification Search .................. 702/188, 702/182–185, 130
See application file for complete search history.

(56) References Cited

U.S. PATENT DOCUMENTS 3,450,542 A  6/1969  Badran
RE27,457 E  8/1972  Rath et al.
RE28,892 E  7/1976  Esty
4,003,728 A  1/1977  Rath
4,474,020 A  10/1984 Freeman
4,494,363 A  1/1985  Rica et al.
4,736,592 A  4/1988  Ohling
4,972,099 A  11/1990 Amano et al.
5,318,789 A  6/1994  Nakagawa et al.
5,333,394 A  8/1994  Hardeman et al.

(Continued)

FOREIGN PATENT DOCUMENTS

GB  2342998  4/2000

(Continued)

OTHER PUBLICATIONS

Esp@cenet Abstract of JP55050675 dated Dec. 19, 1980.

(Continued)

*Primary Examiner*—Edward Raywond
(74) *Attorney, Agent, or Firm*—Ladas & Parry LLP

(57) ABSTRACT

A system for monitoring parameters of produce including at least one sensor assembly for sensing at least one parameter of packaged produce at a plurality of times and locations of the packaged produce; a communications network operative to receive information from the at least one sensor assembly at the plurality of times and locations and to transmit the information to at least one information receiving location; and at least one computer at the at least one information receiving location for receiving the information transmitted via the communications network and for providing an information output representing the at least one parameter at the plurality of times.

20 Claims, 12 Drawing Sheets

U.S. PATENT DOCUMENTS

| | | | |
|---|---|---|---|
| 5,458,899 A | 10/1995 | Floyd et al. |
| 5,556,658 A | 9/1996 | Raudalus et al. |
| 5,658,607 A | 8/1997 | Herdeman |
| 5,704,676 A | 1/1998 | Hill |
| 5,872,721 A | 2/1999 | Huston et al. |
| 5,965,185 A | 10/1999 | Bianco |
| 6,092,430 A | 7/2000 | Liston et al. |
| 6,190,710 B1 | 2/2001 | Nir et al. |
| 6,305,148 B1 | 10/2001 | Bowden et al. |
| 6,615,908 B1 | 9/2003 | Bosher et al. |
| 6,740,346 B2 | 5/2004 | Shapiro |
| 7,392,150 B2 * | 6/2008 | Kuepper et al. ............. 702/130 |

FOREIGN PATENT DOCUMENTS

| | | |
|---|---|---|
| JP | 55-164147 | 11/1980 |
| JP | 55-50675 | 12/1980 |
| JP | 64-35876 | 3/1989 |
| JP | 7-170907 | 7/1995 |

OTHER PUBLICATIONS

Esp@cenet Abstract of JP7170907 dated Jul. 1995.

U.S. Appl. No. 60/474,692.

* cited by examiner

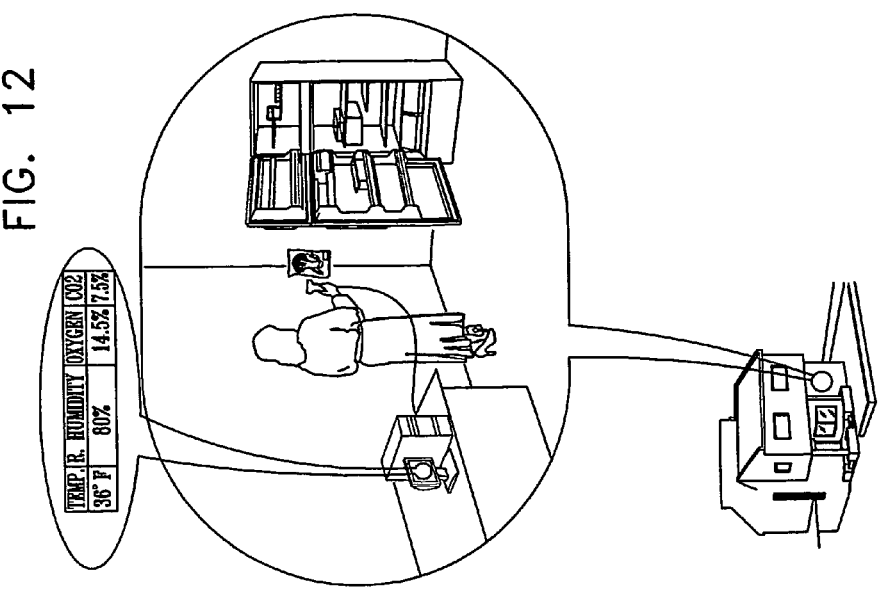
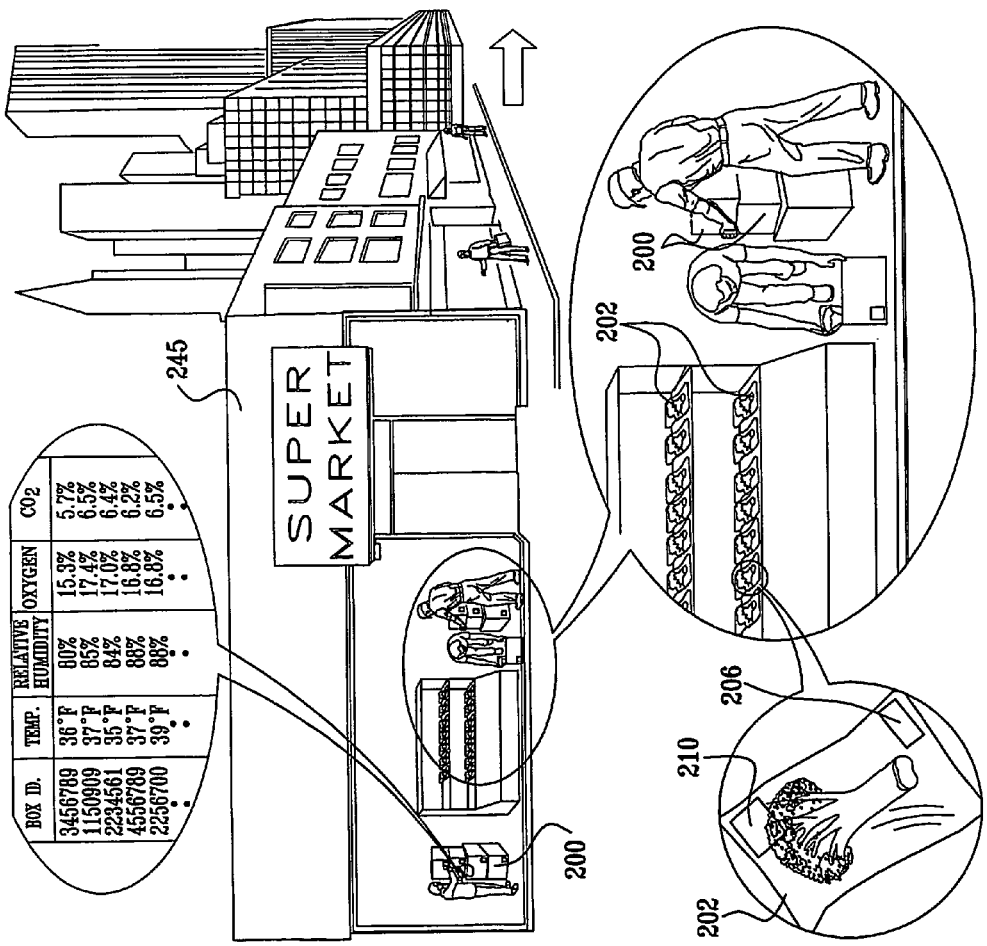
FIG. 12

PRE AND POST-HARVEST QC DATA ACQUISITION SYSTEM FOR AGRICULTURAL PRODUCTS

REFERENCE TO RELATED APPLICATIONS

The present application is a continuation-in-part of and claims priority from U.S. Patent Application Ser. No. 60/474,692, filed May 29, 2003, entitled VACUUM COOLING SYSTEM AND METHOD, the disclosure of which is hereby incorporated by reference.

FIELD OF THE INVENTION

The present invention relates to post-harvest handling and treatment of agricultural produce generally and more particularly to cooling and shipping of agricultural produce.

BACKGROUND OF THE INVENTION

The following U.S. patents are believed to represent the current state of the art: U.S. Pat. Nos. 5,333,394, 6,092,430, 6,615,908, 5,872,721, 6,190,710 and 6,740,346.

SUMMARY OF THE INVENTION

The present invention seeks to provide a system and methodology for monitoring, controlling and reporting the condition of agricultural produce during post-harvest handling.

There is thus provided in accordance with a preferred embodiment of the present invention a system for monitoring parameters of produce including:

at least one sensor assembly for sensing at least one parameter of packaged produce at a plurality of times and locations of the packaged produce;

a communications network operative to receive information from the at least one sensor assembly at the plurality of times and locations and to transmit the information to at least one information receiving location; and at least one computer at the at least one information receiving location for receiving the information transmitted via the communications network and for providing an information output representing the at least one parameter at the plurality of times.

There is also provided in accordance with a preferred embodiment of the present invention a system for monitoring parameters of produce including:

at least one sensor assembly for sensing at least one parameter of packaged produce at a plurality of times and locations of the packaged produce;

a memory operative to store information received from the at least one sensor assembly at the plurality of times and locations and to read out the information at least one information receiving location; and at least one computer at the at least one information receiving location for receiving the information received from the memory and for providing an information output representing the at least one parameter at the plurality of times.

There is additionally provided in accordance with a preferred embodiment of the present invention a method for monitoring parameters of produce including:

sensing at least one parameter of packaged produce at a plurality of times and locations of the packaged produce;

receiving information from said at least one sensor assembly at said plurality of times and locations and transmitting said information to at least one information receiving location; and employing at least one computer at said at least one information receiving location for receiving the information for providing an information output representing the at least one parameter at the plurality of times.

There is further provided in accordance with a preferred embodiment of the present invention a method for monitoring parameters of produce including:

sensing at least one parameter of packaged produce at a plurality of times and locations of the packaged produce;

storing information received from the at least one sensor assembly at the plurality of times and locations and reading out the information at least one information receiving location; and employing at least one computer at the at least one information receiving location for receiving the information received from the memory and for providing an information output representing the at least one parameter at the plurality of times.

Preferably the communications network is operative to receive and transmit the information in at least near real time to the at least one information receiving location.

In accordance with a preferred embodiment of the present invention the system and method employ at least one parameter controller operative in response to at part of the information received via the communications network for controlling at least one of the at least one parameter at at least one time and location.

Preferably, at least one sensor assembly is located within a carton containing multiple items of produce.

Alternatively, the at least one sensor assembly is located within a retail sales package.

As a further alternative, the at least one sensor assembly is associated with multiple packages of produce palletized together.

In accordance with a preferred embodiment of the present invention, the at least one sensor assembly includes functionality for sensing at least one of: temperature, oxygen concentration, $CO_2$ concentration, ethylene concentration and relative humidity.

Preferably, the at least one sensor assembly includes functionality for sensing at least two of: temperature, oxygen concentration, $CO_2$ concentration, ethylene concentration and relative humidity.

More preferably, the at least one sensor assembly includes functionality for sensing at least three of: temperature, oxygen concentration, $CO_2$ concentration, ethylene concentration and relative humidity.

In accordance with a preferred embodiment of the present invention, the at least one parameter controller includes a vacuum cooling controller and the system and method is operative to govern vacuum cooling operation based at least on sensed weight loss of the produce. Preferably, the at least one parameter controller includes a cooling controller and wherein the system is operative to govern cooling operation based at least on sensed temperature.

In accordance with a preferred embodiment of the present invention, the at least one parameter controller includes at least one of a humidity controller, a temperature controller and a gas concentration controller and the system and the method are operative to govern at least one of humidity, temperature and gas concentration based on at least one of sensed humidity, temperature and gas concentration. Preferably, the gas concentration is a concentration of at least one of oxygen, $CO_2$ and ethylene.

Normally, the produce whose parameters are monitored includes at least one of milk products, fruits and vegetables.

In accordance with a preferred embodiment of the present invention, the at least one sensor assembly senses at least one parameter of packaged produce at locations of the packaged produce including at least one and more preferably at least two of a produce harvesting location, a produce cooling location, a produce transporting location, a buyer's warehouse and a retail location.

Preferably, the at least one sensor assembly is located within a modified-atmosphere enclosure enclosing the produce. Alternatively, the at least one sensor assembly is located outside a modified-atmosphere enclosure enclosing the produce.

In accordance with a preferred embodiment of the invention, the memory and/or the communications network is also operative to receive information including at least one of packaging unit ID; shipper ID, harvester ID, grower ID, field ID and produce type ID.

Preferably the system and method employ a produce weight change sensor.

In accordance with a preferred embodiment of the present invention the parameter sensing includes or enables sensing produce parameters by a consumer at a consumer facility.

BRIEF DESCRIPTION OF THE DRAWINGS

The present invention will be understood and appreciated more fully from the following detailed description, taken in conjunction with the drawings in which:

FIG. 12 is a simplified illustration of a typical retail facility and consumer facility-based portion of the system and methodology of FIG. 7.

DETAILED DESCRIPTION OF PREFERRED EMBODIMENTS

Figure 1:
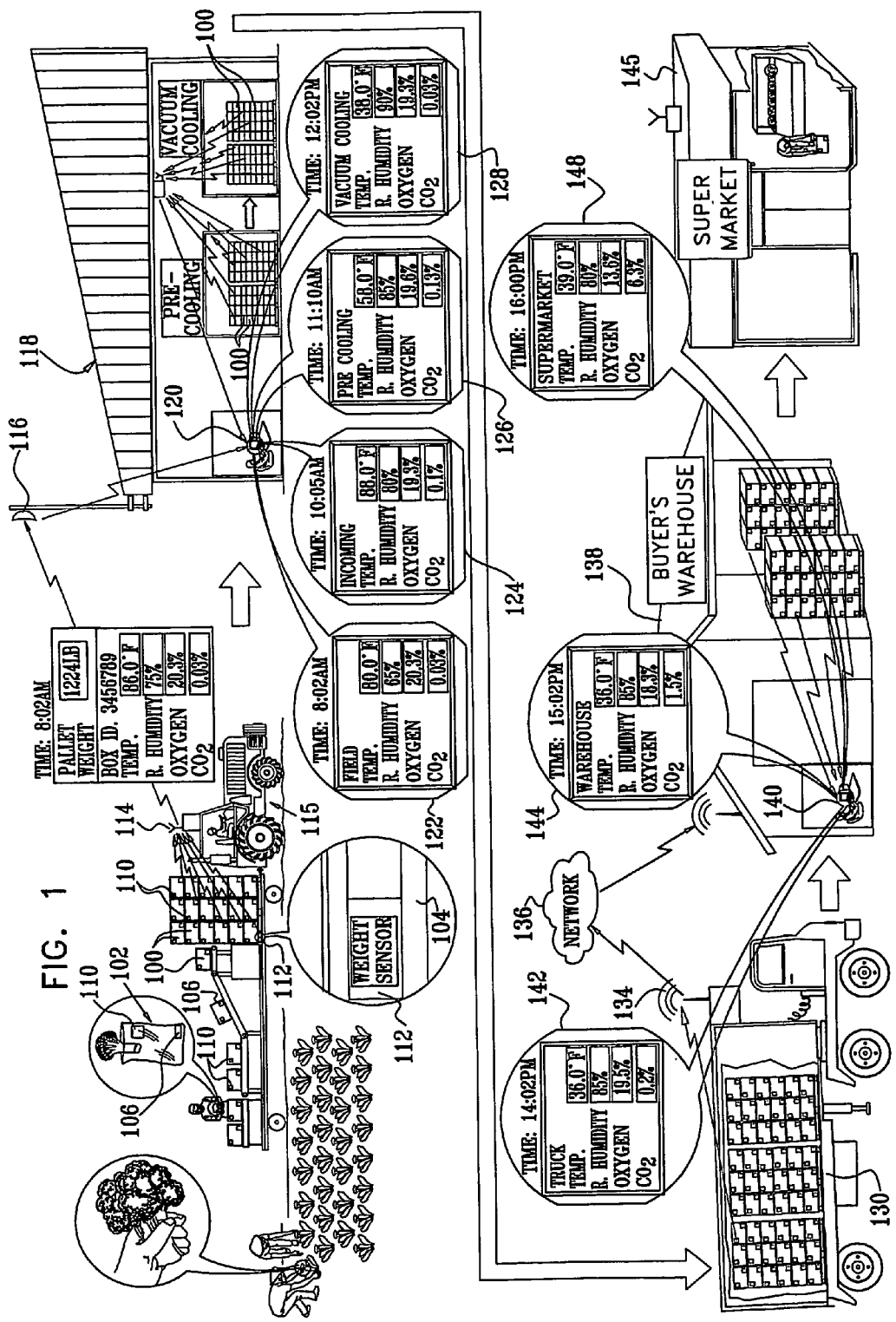
FIG. 1 is a simplified illustration of a system and methodology for monitoring and controlling parameters of post-harvest handling of agricultural produce in accordance with a preferred embodiment of the present invention.
Figure 2:
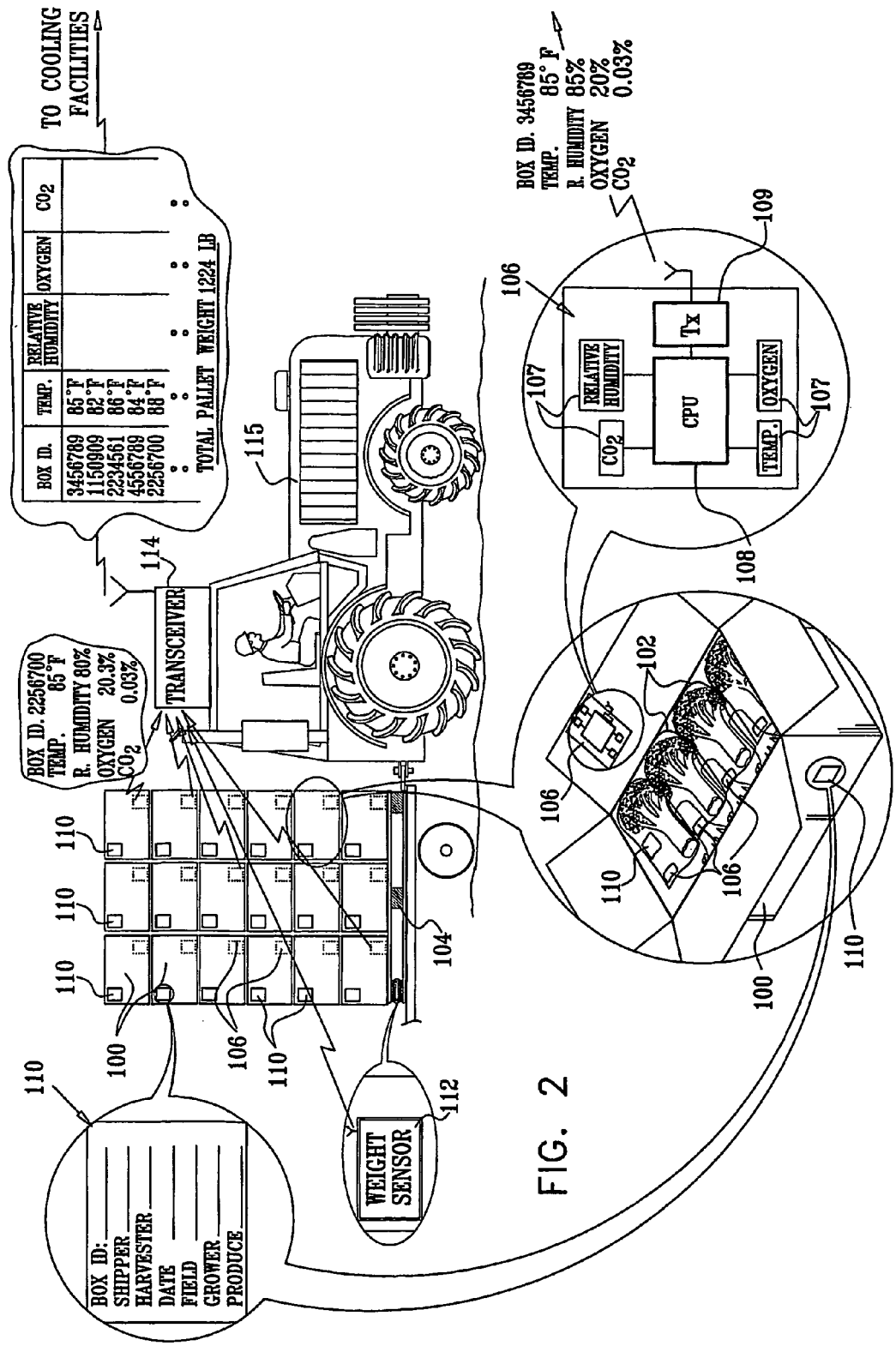
FIG. 2 is a simplified illustration of a typical field-based portion of the system and methodology of FIG. 1.
Figure 3:
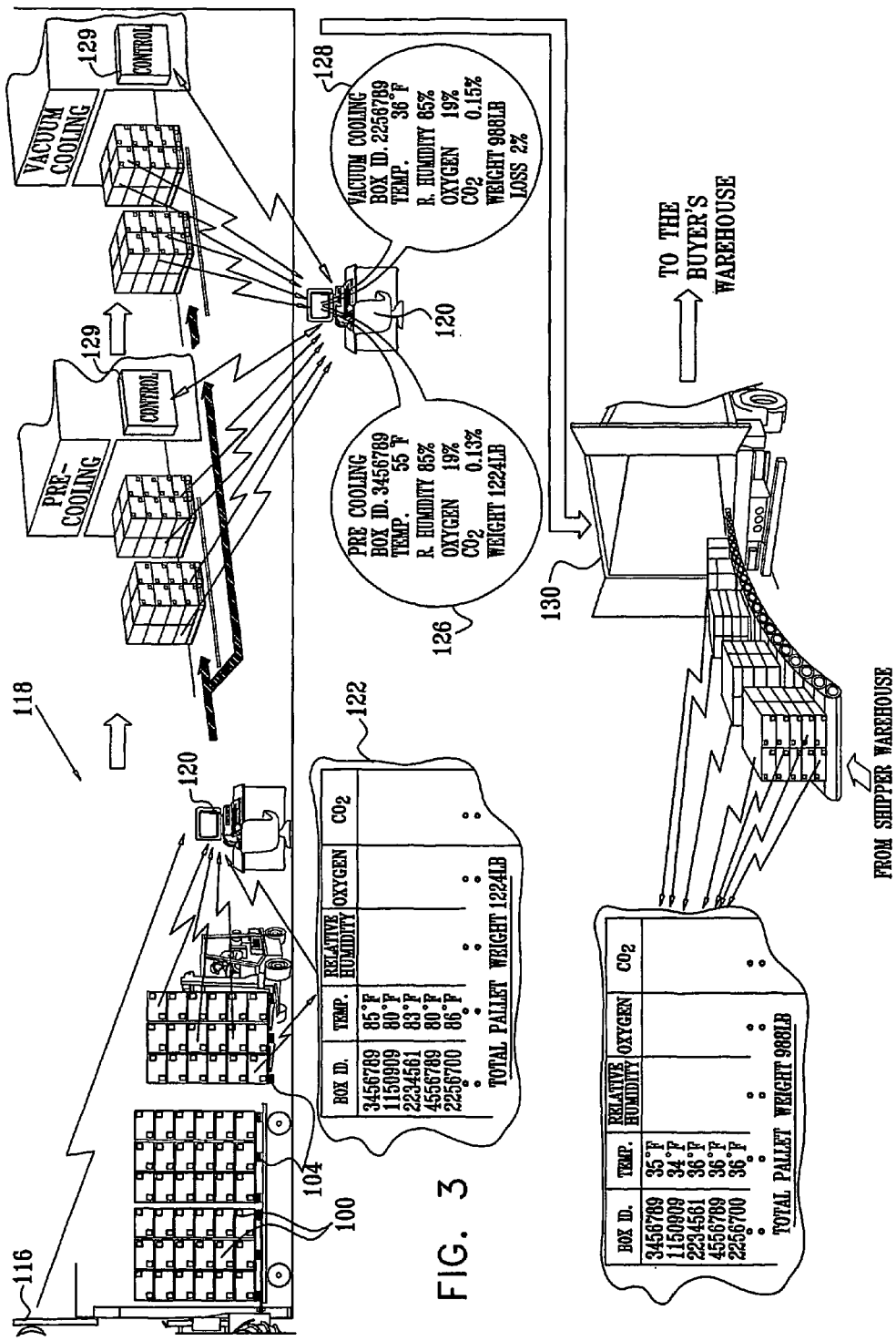
FIG. 3 is a simplified illustration of a typical packing, cooling and shipping facility-based portion of the system and methodology of FIG. 1.
Figure 4:
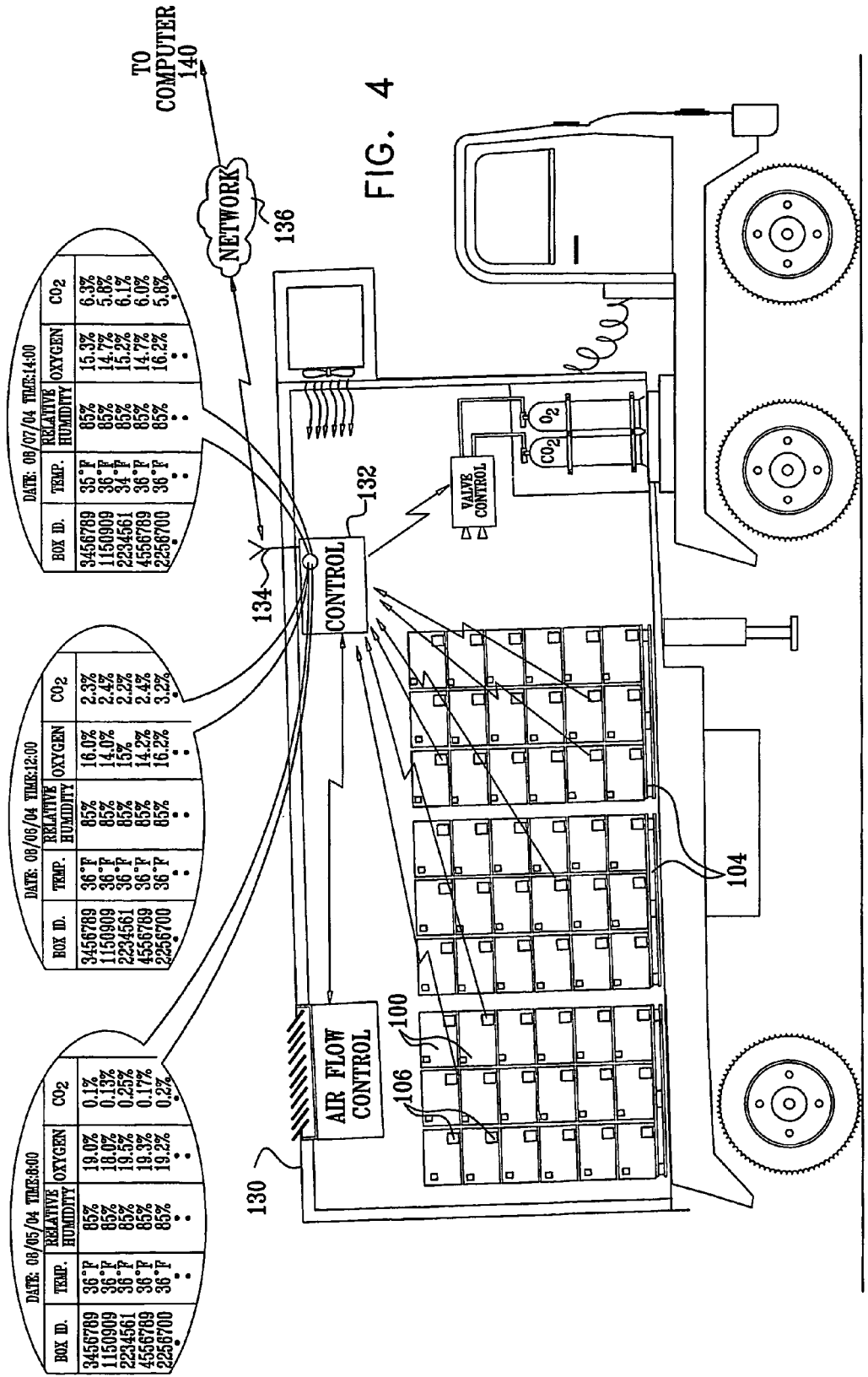
FIG. 4 is a simplified illustration of a typical transport vehicle-based portion of the system and methodology of FIG. 1.
Figure 5:
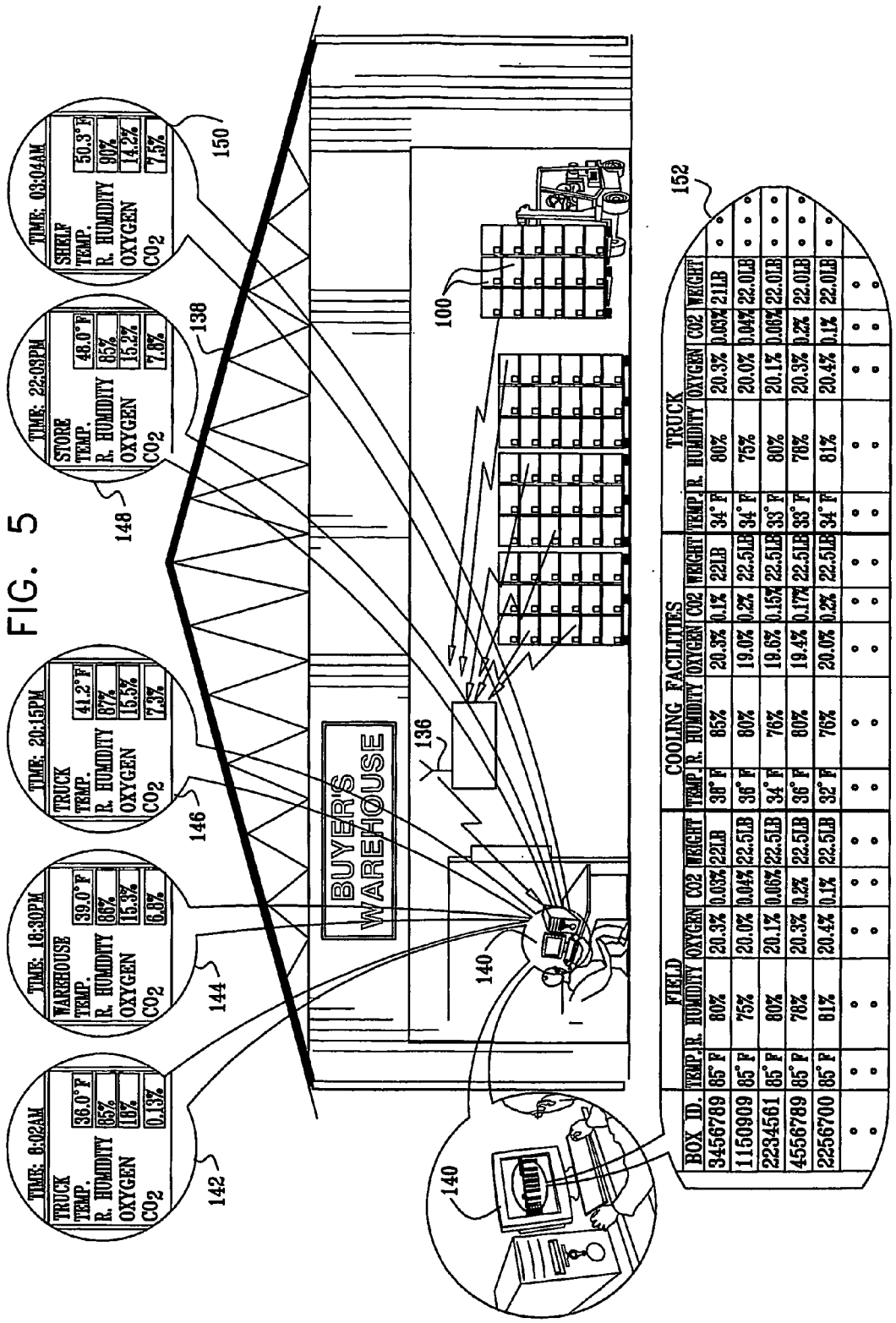
FIG. 5 is a simplified illustration of a typical buyer's warehouse-based portion of the system and methodology of FIG. 1.
Figure 6:
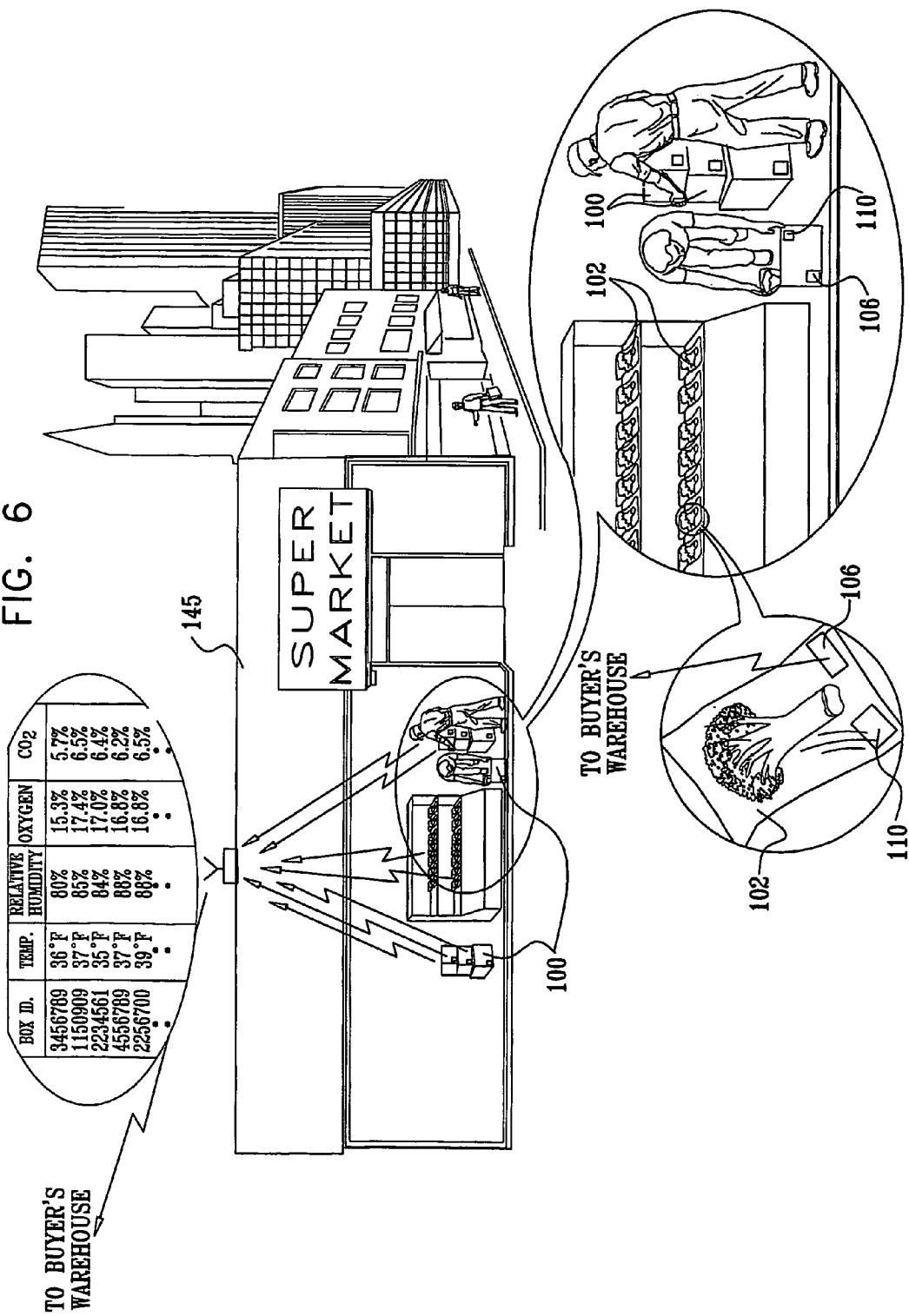
FIG. 6 is a simplified illustration of a typical retail facility-based portion of the system and methodology of FIG. 1.

Reference is now made to FIGS. 1-6, which are simplified illustrations of a system and methodology for monitoring and controlling parameters of post-harvest handling of agricultural produce in accordance with a preferred embodiment of the present invention.

As seen in FIGS. 1-6, agricultural produce, such as broccoli, is harvested in a field and packaged in cartons 100. In accordance with one preferred embodiment of the present invention, one or more items of produce are packaged within a modified-atmosphere enclosure, such as a sealed plastic bag 102, preferably formed of XTEND® material, commercially available from the present assignee, Stepac L. A. Ltd. of Tefen, Western Galilee, Israel. Preferred modified-atmosphere material useful in such bags is described in assignee's U.S. Pat. No. 6,190,710, the disclosure of which is hereby incorporated by reference. Preferred bag and carton structures are described in assignee's U.S. Pat. No. 6,740,346, the disclosure of which is hereby incorporated by reference. Different types of modified-atmosphere enclosures may be suitable for different types of produce. Some produce need not be packaged in modified-atmosphere enclosures.

One or more sealed plastic bags 102 are placed within each carton 100 and the cartons are closed and then stacked on a pallet 104. Alternatively, modified-atmosphere enclosures are not employed and the produce is placed directly within each carton or other package.

In accordance with a preferred embodiment of the present invention, each packaging unit is provided with at least one sensor assembly 106 for sensing at least one parameter of packaged produce at a plurality of times and locations of the packaged produce. Alternatively less than all of the packaging units are provided with sensor assemblies 106, but a sufficient number of sensor assemblies 106 are employed in order to provide a representative sampling of produce parameters. In accordance with a preferred embodiment of the present invention, the packaging unit is the carton 100 and the sensor assembly 106 may be mounted onto a surface of the carton 100, preferably an interior surface. Alternatively, the packaging unit may be the bag 102 and the sensor assembly 106 may be placed therein. As a further alternative, the packaging unit may be a stack of cartons, such as a palletized stack, or even a truckload of cartons or other packages.

In one embodiment of the invention, bags 102 may be retail sale packages, which are not opened other than by the consumer. In such a case, an individual sensor assembly 106 may be provided for each retail sale package, providing the opportunity for a consumer to receive an indication of at least one parameter of the produce contained in a specified bag throughout its post-harvest handling, possibly including storage at consumer premises.

In another embodiment of the invention, bags 102 and cartons 100 are wholesale unit packages, which are opened at a retail sales facility, such as a supermarket. In such a case, an individual sensor assembly 106 may be provided for such bag 102 or carton 100, providing the opportunity for a wholesale buyer to receive an indication of at least one parameter of the produce contained in a specified bag 102 or carton 100 throughout its post-harvest handling, even enroute, so as to be able to reject shipments whose parameters do not meet the buyer's requirements, even before delivery. When not all of the packaging units are equipped with sensor assemblies 106, the wholesale buyer receives a representative indication of at least one parameter.

Preferably, each sensor assembly 106 includes a plurality of individual parameter sensors 107, such as a CO2 sensor, a relative humidity sensor, a temperature sensor and an oxygen sensor, which preferably communicate with a CPU 108, which outputs via a wireless transmitter 109. The sensor assembly 106 preferably has sleep mode functionality, so as to save power prior to actuation thereof, such as by receipt of a wireless input thereat. Similar actuations may be employed for recording the location of the produce at various times. GPS functionality may also be employed for this purpose and may be incorporated in sensor assemblies 106.

Preferably, each packaging unit comprises an identifier 110, typically in the form of a label or tag or alternatively directly printed on a packaging unit, which indicates in a machine and/or human readable form some and preferably all of the following information: packaging unit ID; shipper ID, harvester ID, grower ID, field ID and produce type ID. Preferably, the CPU 108 also includes a downloadable memory, which stores the above identifier information as well as parameters sensed continuously or from time to time by the sensors 107 of the sensor assembly 106, preferably at least one of temperature, relative humidity, and concentrations of oxygen, CO2 and ethylene and date and time stamps such parameters.

In accordance with a preferred embodiment of the invention, each pallet 104 is equipped with a weight sensor 112, thereby enabling the weight of the produce supported thereon to be readily monitored. Alternatively, at various relevant stages of post-harvest handling, the pallet may be weighed and changes in the weight recorded and noted.

In accordance with a preferred embodiment of the present invention, wireless transmitter 109 transmits data representing the "static" information appearing on identifier 110, as well as "dynamic" information representing the variable parameters sensed by sensor assembly 106 and weight sensor 112. Preferably, the transmitter 109 is operated so as to transmit samples of the above information at spaced time intervals, such as once per hour.

At an initial stage, information transmitted by transmitters 109 may be received by a transceiver 114 mounted onto a tractor 115 or other transport vehicle adjacent to the transmitters 109. Transceiver 114 may simultaneously or at suitable times transmit this information to a transceiver 116 located at a packing/cooling/shipping facility 118 for receipt by a computer 120 located thereat. It is appreciated that such an arrangement enables a supervisor at the packing/cooling/shipping facility 118 to monitor the condition of produce being harvested, as indicated at reference numeral 122, and transported to the facility even before the produce arrives, so as to be able to schedule appropriate types and duration of cooling.

Preferably information regarding various relevant parameters of the produce is sampled and stored at computer 120 when the produce arrives at the packing/cooling/shipping facility 118, as indicated at reference numeral 124, following pre-cooling, as indicated at reference numeral 126 and following vacuum cooling, as indicated at reference numeral 128. It is appreciated that, depending on the type of produce and its parameters, various types of cooling or no cooling may be appropriate. Typically the produce parameters sensed at the time of arrival of the produce at facility 118 determine the cooling parameters.

When vacuum cooling is applied, the real-time weight loss of the produce is preferably monitored and used for controlling the extent and duration of vacuum cooling, so as not to dry out the produce to an unacceptable extent. The control functionality may readily be realized by wireless communication between computer 120 and one or more cooling controllers 129.

Monitoring of the various parameters of the produce by sensor assemblies 106 preferably continues while the produce is stored in cold storage prior to loading and while it is loaded onto transport vehicles 130 for shipment to customers and for the duration of the shipment. Normally, such monitoring enables real-time or manual control of at least one parameter of the produce, normally temperature, by suitable control of a transport vehicle cooling system. When controlled-atmosphere shipping containers, such as those employing Carrier Transicold EverFresh container refrigeration units, commercially available from Carrier Corporation, are employed, the oxygen, CO2, ethylene and relative humidity of the produce may also be controlled in real-time or near real-time by employing an on-board computer 132 for controlling ventilation and release of pressurized gases into the interior of the transport vehicle in response to outputs of the sensor assemblies 106.

During transport, information transmitted by transmitters 109 may be received by a transceiver 134 mounted onto the transport vehicle 130. Transceiver 134 may simultaneously or at suitable times transmit this information via a communications network 136, such as the internet or via a proprietary wireless network such as a cellular network, or via any other suitable communications link to a buyer's warehouse facility 138 for receipt by a computer 140 located thereat. It is appreciated that such an arrangement enables a supervisor at the buyer's warehouse facility 138 to monitor the condition of produce being shipped, as indicated at reference numeral 142, even before the produce arrives, so as to be able to reject shipments enroute which do not meet the buyer's requirements or to schedule shipments to retail outlets as a function of anticipated shelf life of the produce being shipped.

Preferably, information regarding various relevant parameters of the produce is also sampled and stored at computer 140 when the produce arrives at the buyer's warehouse facility 138, as indicated at reference numeral 144, during shipment to a retail outlet 145, as indicated at reference numeral 146, when it arrives at the retail outlet 145, as indicated at reference numeral 148, and possibly until such time as it is removed from the packaging unit, as indicated at reference numeral 150. A comprehensive report on the parameter history of the produce, such as indicated at reference numeral 152 is preferably made available to the supervisor. Such a report may be presented for each packaging unit or alternatively may be summarized and/or averaged for groups of packaging units.

Figure 7:
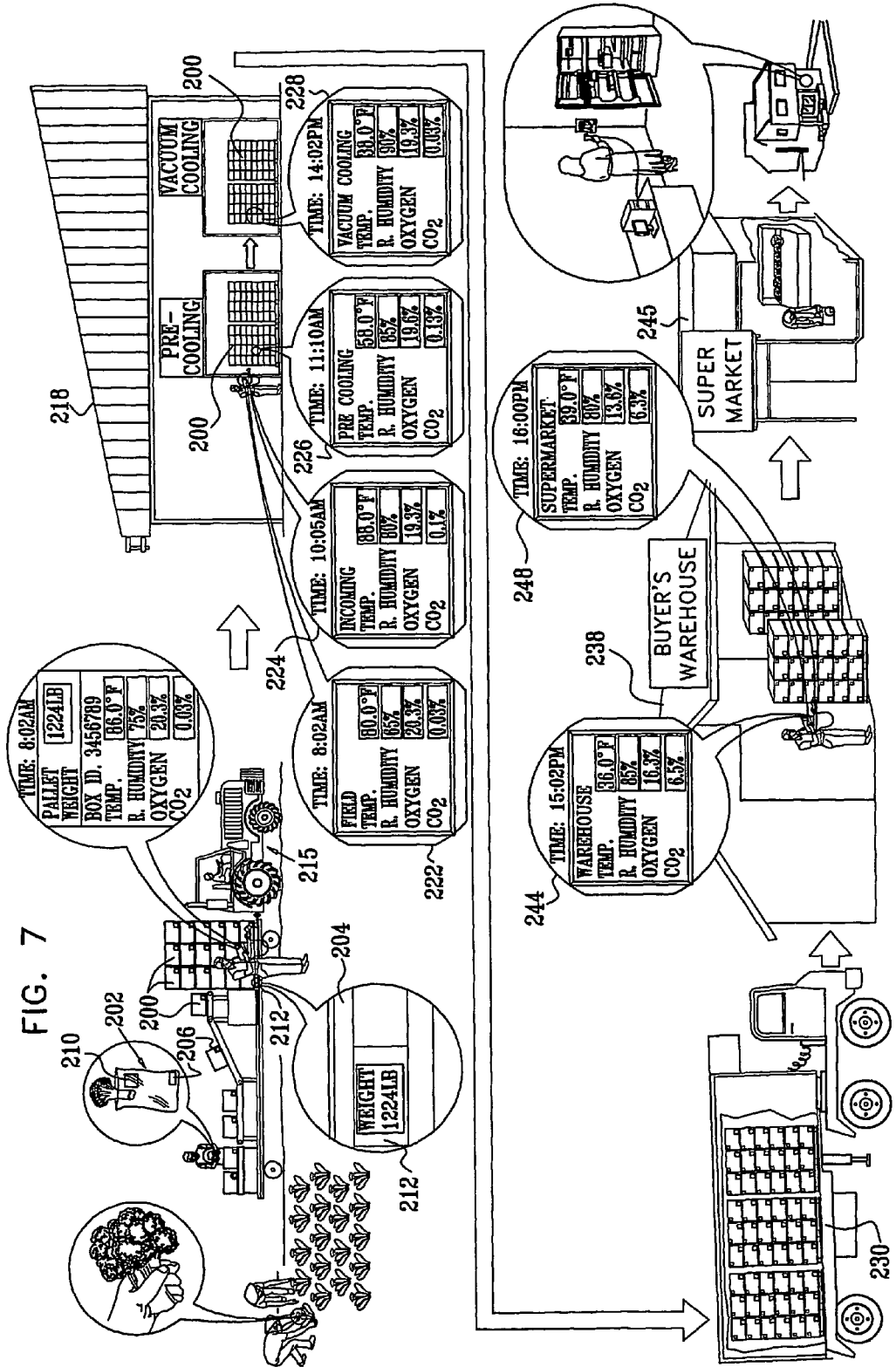
FIG. 7 is a simplified illustration of a system and methodology for monitoring and controlling parameters of post-harvest handling of agricultural produce in accordance with another preferred embodiment of the present invention.
Figure 8:
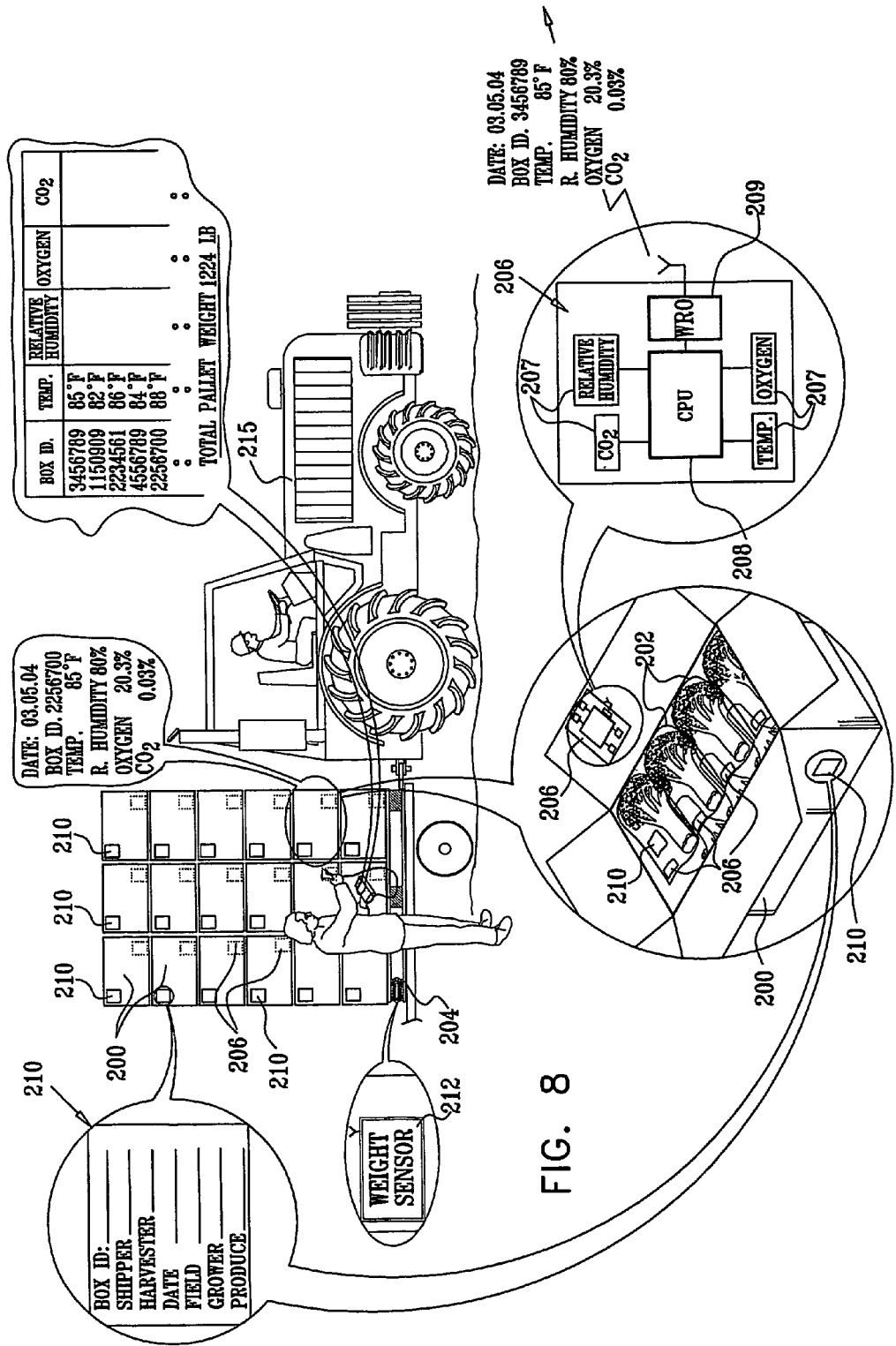
FIG. 8 is a simplified illustration of a typical field-based portion of the system and methodology of FIG. 7.
Figure 9:
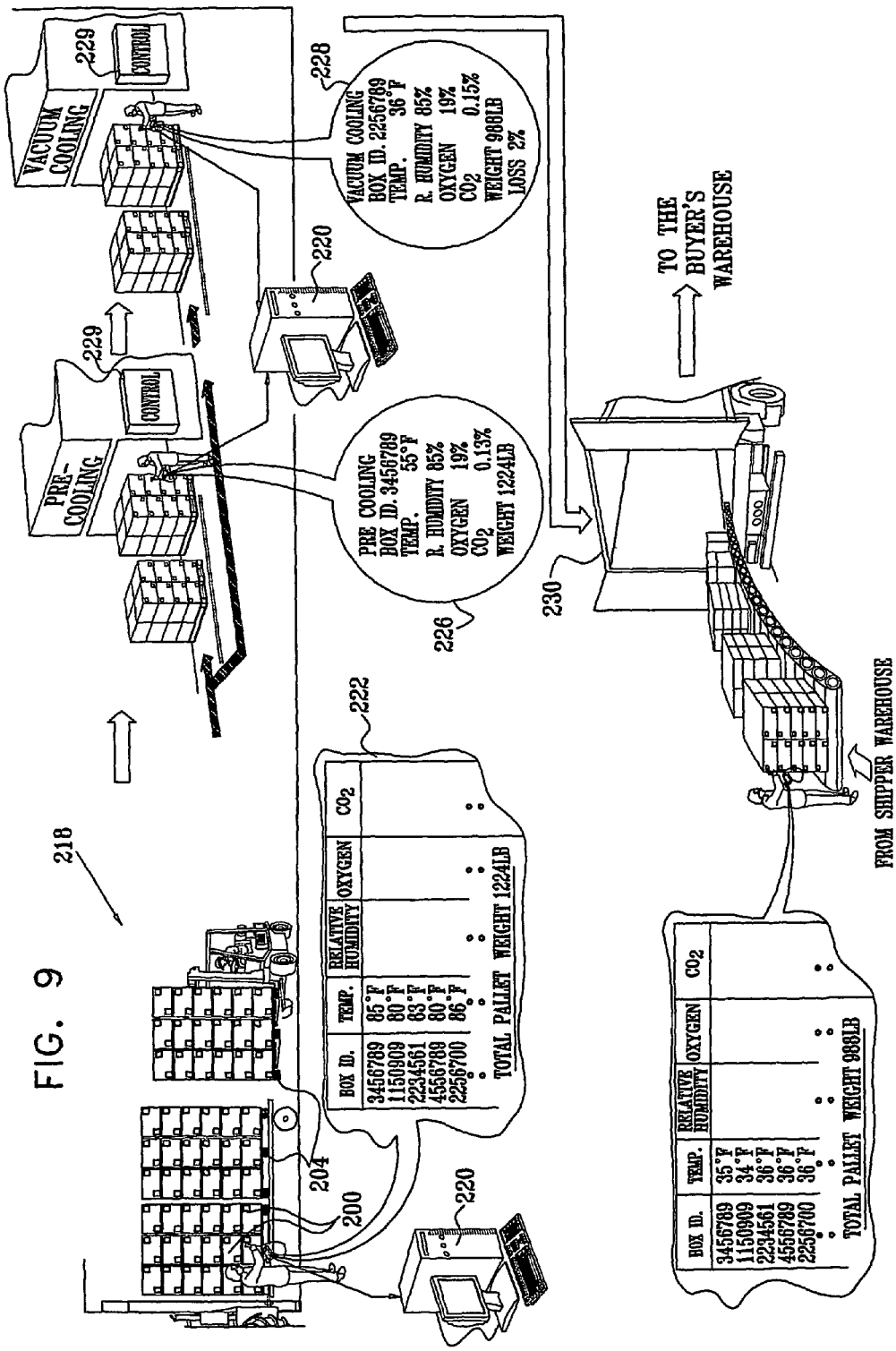
FIG. 9 is a simplified illustration of a typical packing and cooling facility-based portion of the system and methodology of FIG. 7.
Figure 10:
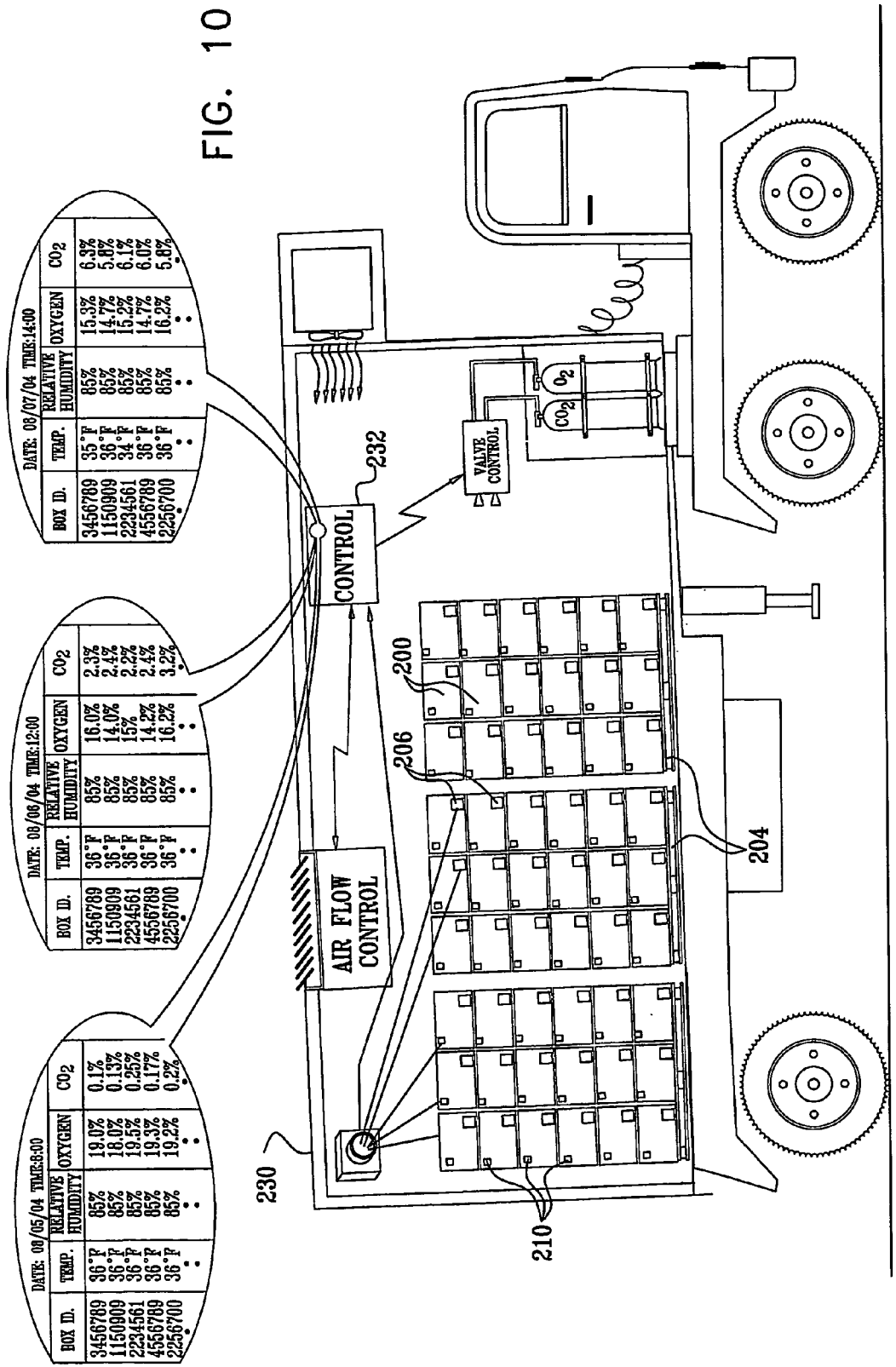
FIG. 10 is a simplified illustration of a typical transport vehicle-based portion of the system and methodology of FIG. 7.
Figure 11:
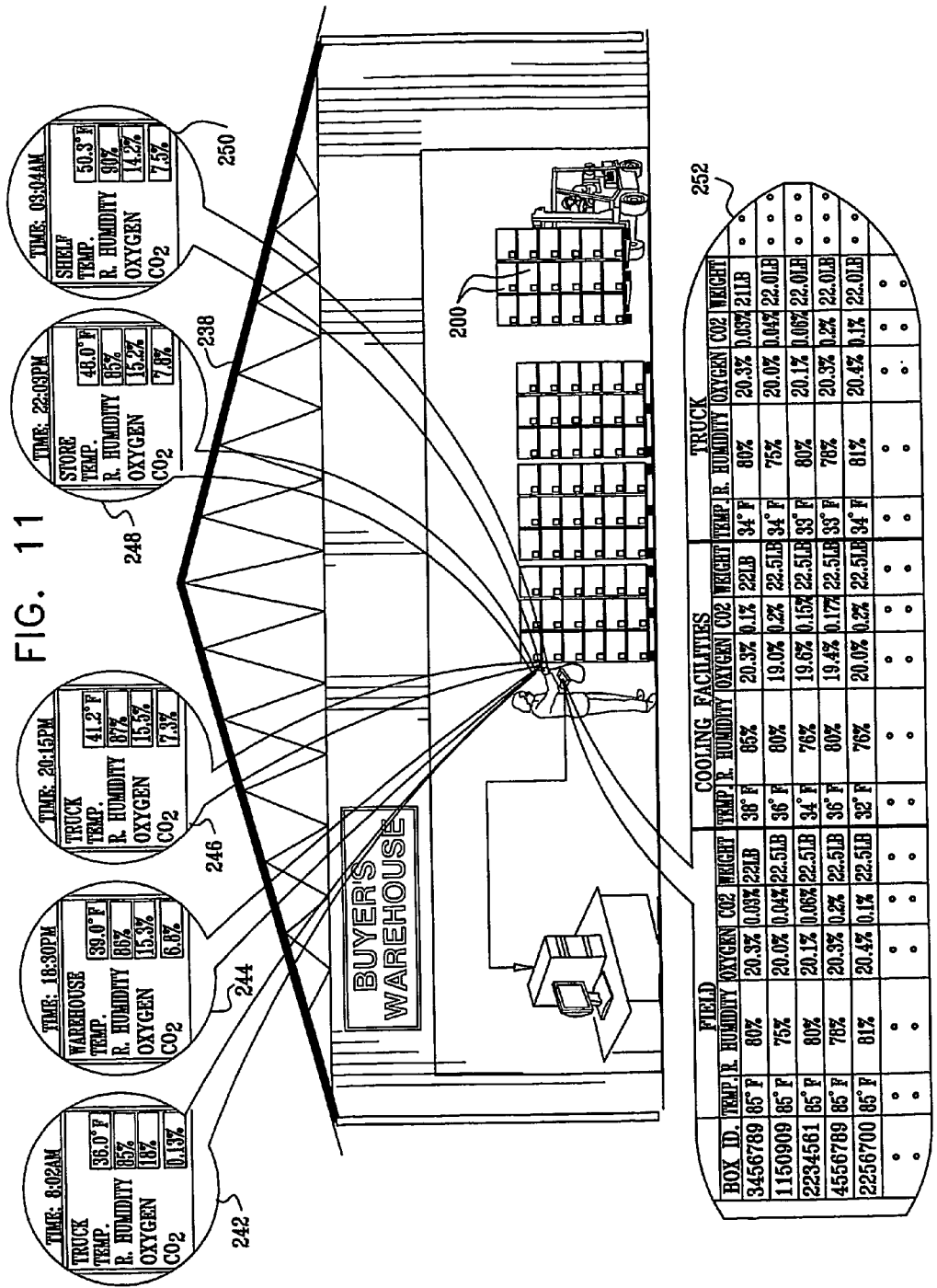
FIG. 11 is a simplified illustration of a typical buyer's warehouse-based portion of the system and methodology of FIG. 7.

Reference is now made to FIGS. 7-12, which are simplified illustrations of a system and methodology for monitoring and controlling parameters of post-harvest handling of agricultural produce in accordance with another preferred embodiment of the present invention. The embodiment of FIGS. 7-12 differs from that of FIGS. 1-6 in that it typically does not include long-distance wireless transmission functionality, but instead employs only memory functionality that accompanies the produce packaging unit from the field to the consumer.

As seen in FIGS. 7-12, agricultural produce, such as broccoli, is harvested in a field and packaged in cartons 200. In accordance with one preferred embodiment of the present invention, one or more items of produce are packaged within a modified-atmosphere enclosure, such as a sealed plastic bag 202, preferably formed of XTEND® material, commercially available from the present assignee, Stepac L. A. Ltd. of Tefen, Western Galilee, Israel. Preferred modified-atmosphere material useful in such bags is described in U.S. Pat. No. 6,190,710, the disclosure of which is hereby incorporated by reference. Preferred bag and carton structures are described in assignee's U.S. Pat. No. 6,740,346, the disclosure of which is hereby incorporated by reference. Different types of modified-atmosphere enclosures may be suitable for different types of produce. Some produce need not be packaged in modified-atmosphere enclosures.

One or more sealed plastic bags 202 are placed within each carton 200 and the cartons are closed and then stacked on a pallet 204. Alternatively, modified-atmosphere enclosures are not employed and the produce is placed directly within each carton or other package.

In accordance with a preferred embodiment of the present invention, each packaging unit is provided with at least one sensor assembly 206 for sensing at least one parameter of packaged produce at a plurality of times and locations of the packaged produce. Alternatively less than all of the packaging units are provided with sensor assemblies 206, but a sufficient number of sensor assemblies 206 are employed in order to provide a representative sampling of produce parameters. In accordance with a preferred embodiment of the present invention, the packaging unit is the carton 200 and the sensor assembly 206 may be mounted onto a surface of the carton 200, preferably an interior surface. Alternatively, the packaging unit may be the bag 202 and the sensor assembly 206 may be placed therein. As a further alternative, the packaging unit may be a stack of cartons, such as a palletized stack, or even a truckload of cartons or other packages.

In one embodiment of the invention, bags 202 may be retail sale packages, which are not opened other than by the consumer. In such a case, an individual sensor assembly 206 may be provided for each retail sale package, providing the opportunity for a consumer to receive an indication of at least one parameter of the produce contained in a specified bag throughout its post-harvest handling, possibly including storage at consumer premises.

In another embodiment of the invention, bags 202 and cartons 200 are wholesale unit packages, which are opened at a retail sales facility, such as a supermarket. In such a case, an individual sensor assembly 206 may be provided for such bag 202 or carton 200, providing the opportunity for a wholesale buyer to receive an indication of at least one parameter of the produce contained in a specified bag 202 or carton 200 throughout its post-harvest handling, even enroute, so as to be able to reject shipments whose parameters do not meet the buyer's requirements, even before delivery. When not all of the packaging units are equipped with sensor assemblies 206, the wholesale buyer receives a representative indication of at least one parameter.

Preferably, each sensor assembly 206 comprises a plurality of individual parameter sensors 207, such as a CO2 sensor, a relative humidity sensor, a temperature sensor and an oxygen sensor, which preferably communicate with a CPU 208, that preferably includes a downloadable memory, and is associated with wireless readout functionality 209, such as resonant tag functionality. In accordance with a preferred embodiment of the invention, the sensor assembly 206 may readily be incorporated onto a label or smart card which incorporates a suitable integrated circuit. The contents of the memory may thus be read by any suitable conventional smart card reader, non-contact readout device or the like. The sensor assembly 206 preferably has sleep mode functionality, so as to save power prior to actuation thereof, such as by receipt of a wireless input thereat. Similar actuations may be employed for recording the location of the produce at various times. GPS functionality may also be employed for this purpose and may be incorporated in sensor assemblies 206.

Preferably, each packaging unit also comprises an identifier 210, typically in the form of a label or tag, or alternatively directly printed on a packaging unit, which indicates in a machine and/or human readable form some and preferably all of the following information: packaging unit ID; shipper ID, harvester ID, grower ID, field ID and produce type ID. Preferably, the memory also stores the above "static" information as well as "dynamic" information representing parameters sensed continuously or from time to time by sensors 207 of the sensor assembly 206, preferably at least temperature, relative humidity, and concentrations of oxygen, CO2 and ethylene and date and time stamps such parameters.

In accordance with a preferred embodiment of the invention, each pallet 204 is equipped with a weight sensor 212, thereby enabling the weight of the produce supported thereon to be readily monitored. Alternatively, at various relevant stages of post-harvest handling, the pallet may be weighed and changes in the weight recorded and noted.

In accordance with a preferred embodiment of the present invention, the memory of each sensor assembly 206 which is preferably mounted on a smart card or the like and which stores produce parameter data over time, is readily read by conventional short range interrogation apparatus, such as IR or Bluetooth communicators. The downloadable information includes both static and dynamic information regarding the origin and post-harvest history of the produce in one or more packaging units.

Interrogation of a memory forming part of or associated with each sensor assembly 206 may take place at all relevant post-harvest stages of the produce, including in the field, just after harvest, during transport to the packing/cooling/shipping facility, upon arrival at the packing/cooling/shipping facility, at various stages during cooling and storage thereafter, during loading for shipment, at various times during shipment, upon arrival at a buyer's warehouse, during storage at a buyer's warehouse, during shipment to a retail outlet, upon arrival at the retail outlet, at various times on the shelf and even during storage at a consumer's premises.

It is appreciated that such an arrangement enables a supervisor in the field and/or at the packing/cooling/shipping facility 218 to monitor the condition of produce being harvested, as indicated at reference numeral 222 even before the produce arrives at the packing/cooling/shipping facility, so as to be able to schedule appropriate types and duration of cooling.

Preferably information regarding various relevant parameters of the produce is read from the memory and stored at computer 220 when the produce arrives at the packing/cooling/shipping facility 218, as indicated at reference numeral 224, following pre-cooling, as indicated at reference numeral 226, following vacuum cooling, as indicated at reference numeral 228 and during storage thereafter. It is appreciated that, depending on the type of produce and its parameters, various types of cooling or no cooling may be appropriate. When vacuum cooling is applied, the real-time weight loss of the produce is preferably monitored and used for controlling the extent and duration of vacuum cooling, so as not to dry out the produce to an unacceptable extent. Typically the produce parameters sensed at the time of arrival of the produce at facility 218 determine the cooling parameters.

Monitoring of the various parameters of the produce by sensor assemblies 206 preferably continues when the produce is loaded onto transport vehicles 230 for shipment to customers and for the duration of the shipment. Normally, such monitoring enables real-time or manual control of at least one parameter of the produce, normally temperature, by suitable control of a transport vehicle cooling system. When controlled-atmosphere shipping containers are employed, the oxygen, CO2, ethylene and relative humidity of the produce may also be controlled in real-time or near real-time by employing an on-board computer 232 for controlling ventilation and release of pressurized gases into the interior of the transport vehicle in response to outputs of the sensor assemblies 206.

During transport, information is collected in the memory. Upon arrival at a buyer's warehouse facility 238 a supervisor can download the information collected in the memory into computer 240 at facility 238. A comprehensive report on the parameter history of the produce is preferably made available to the supervisor. Such a report may be presented for each packaging unit or alternatively may be summarized and/or averaged for groups of packaging units. It is appreciated that such an arrangement enables a supervisor at the buyer's warehouse facility 238 to monitor the condition of produce being shipped, as indicated at reference numeral 242, and to schedule shipments to retail outlets as a function of anticipated shelf life of the produce being shipped.

Preferably information regarding various relevant parameters of the produce is retrieved from the memory and stored at computer 240 when the produce arrives at the buyer's warehouse facility 238, as indicated at reference numeral 244. Additionally, information regarding various relevant parameters of the produce is collected in the memory during shipment to a retail outlet, as indicated at reference numeral 246, when it arrives at the retail outlet, as indicated at reference numeral 248, and until it is removed from the packaging unit, as indicated at reference numeral 250. As seen with particularly in FIG. 12, the various produce parameters can also be monitored by a consumer at a consumer facility by simply reading from the memory using a conventional smart card reader, remote readout device or the like. In this way, a consumer can determine whether produce which is being stored continues to be suitable for consumption.

It will be appreciated by persons skilled in the art that the present invention is not limited by what has been particularly shown and described hereinabove. Rather the scope of the invention includes both combinations and sub-combinations of features described hereinabove as well as modifications thereof which would occur to persons skilled in the art upon reading the foregoing description and which are not in the prior art.

The invention claimed is:

1. A system for monitoring parameters of produce comprising:
   a plurality of sensor assemblies for sensing at least one parameter of packaged produce at a plurality of times and locations of said packaged produce;
   at least one transceiver receiving information relating to said at least one parameter of packaged produce from said plurality of sensor assemblies;
   a communications network operative to receive information relating to said at least one parameter of packaged produce at said plurality of times and locations of said packaged produce sensed by multiple sensor assemblies from said at least one transceiver to transmit said information to at least one information receiving location; and
   at least one computer at said at least one information receiving location for receiving said information transmitted by said at least one transceiver via said communications network and for providing an information output relating to said at least one parameter of packaged produce at said plurality of times and locations of said packaged produce sensed by multiple sensor assemblies.

2. A system for monitoring parameters of produce according to claim 1 and wherein said communications network is operative to receive and transmit said information in at least near real time to said at least one information receiving location.

3. A system for monitoring parameters of produce according to claim 1 and also comprising at least one parameter controller operative in response to at least part of said information received via said communications network for controlling at least one of said at least one parameter at least one time and location.

4. A system for monitoring parameters of produce according to claim 1 and wherein at least one of said plurality of sensor assemblies is located within a carton containing multiple items of produce.

5. A system for monitoring parameters of produce according to claim 1 and wherein at least one of said plurality of sensor assemblies is located within a retail sales package.

6. A system for monitoring parameters of produce according to claim 1 and wherein at least one of said plurality of sensor assemblies is associated with multiple packages of produce palletized together.

7. A system for monitoring parameters of produce according to claim 1 and wherein at least one of said plurality of sensor assemblies includes functionality for sensing at least one of: temperature, oxygen concentration, $CO_2$ concentration, ethylene concentration and relative humidity.

8. A system for monitoring parameters of produce according to claim 1 and wherein at least one of said plurality of sensor assemblies includes functionality for sensing at least two of: temperature, oxygen concentration, $CO_2$ concentration, ethylene concentration and relative humidity.

9. A system for monitoring parameters of produce according to claim 1 and wherein at least one of said plurality of sensor assemblies includes functionality for sensing at least three of: temperature, oxygen concentration, $CO_2$ concentration, ethylene concentration and relative humidity.

10. A system for monitoring parameters of produce according to claim 3 and wherein said at least one parameter controller comprises a vacuum cooling controller and wherein said system is operative to govern vacuum cooling operation based at least on sensed weight loss of said produce.

11. A system for monitoring parameters of produce according to claim 3 and wherein said at least one parameter controller comprises a cooling controller and wherein said system is operative to govern cooling operation based at least on sensed temperature.

12. A system for monitoring parameters of produce according to claim 3 and wherein said at least one parameter controller comprises a humidity controller and wherein said system is operative to govern humidity control operation based at least on sensed humidity.

13. A system for monitoring parameters of produce according to claim 3 and wherein said at least one parameter controller comprises a temperature controller and wherein said system is operative to govern temperature control operation based at least on sensed temperature.

14. A system for monitoring parameters of produce according to claim 3 and wherein said at least one parameter controller comprises a gas concentration controller and wherein said system is operative to govern gas concentration control operation based at least on sensed gas concentration.

15. A system for monitoring parameters of produce according to claim 14 and wherein said gas concentration is a concentration of at least one of oxygen, $CO_2$ and ethylene.

16. A system for monitoring parameters of produce according to claim 1 and wherein said produce includes at least one of milk products, fruits and vegetables.

17. A system for monitoring parameters of produce according to claim 1 and wherein at least one of said plurality of sensor assemblies senses at least one parameter of packaged produce at locations of said packaged produce including at least one of a produce harvesting location, a produce cooling location, a produce transporting location, a buyer's warehouse and a retail location.

18. A system for monitoring parameters of produce according to claim 1 and wherein at least one of said plurality of sensor assemblies senses at least one parameter of packaged produce at locations of said packaged produce including at least two of a produce harvesting location, a produce cooling location, a produce transporting location, a buyer's warehouse and a retail location.

19. A system for monitoring parameters of produce according to claim 1 and wherein at least one of said plurality of sensor assemblies is located within a modified-atmosphere enclosure enclosing said produce.

20. A system for monitoring parameters of produce according to claim 1 and wherein at least one of said plurality of sensor assemblies is located outside a modified-atmosphere enclosure enclosing said produce.

* * * * *